Feb. 17, 1959 W. L. GERRANS 2,873,771
TRAY LOADING APPARATUS
Filed Sept. 26, 1955 2 Sheets-Sheet 2
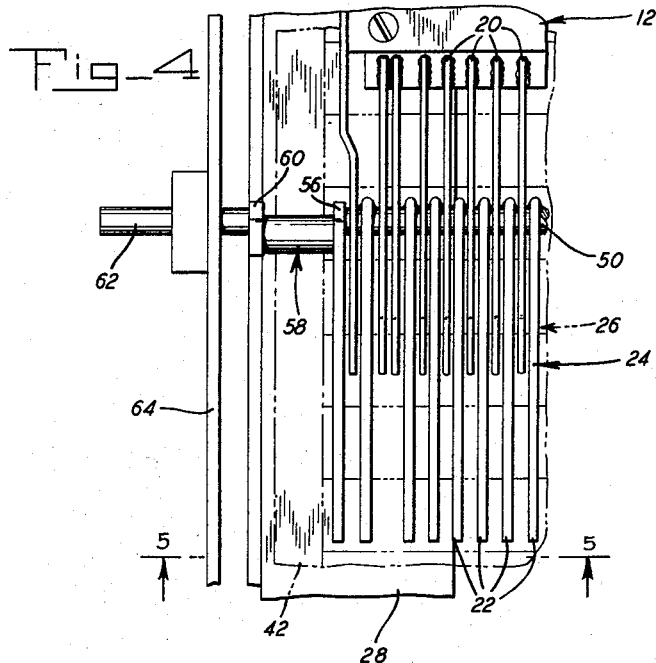
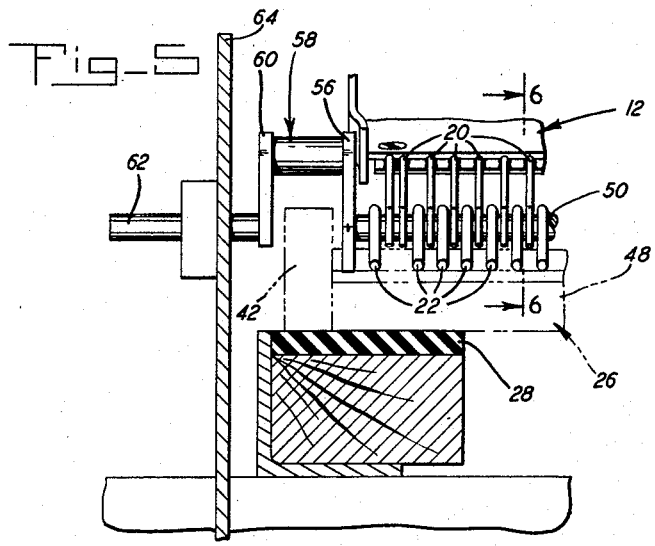
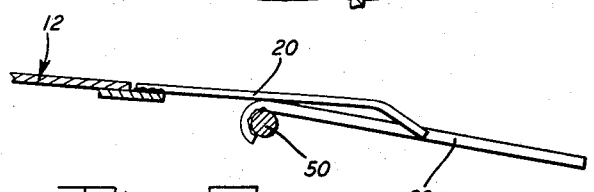
INVENTOR.
WILLIAM L. GERRANS
BY
*Paul B. Fike*
PATENT AGENT 2,873,771
Patented Feb. 17, 1959

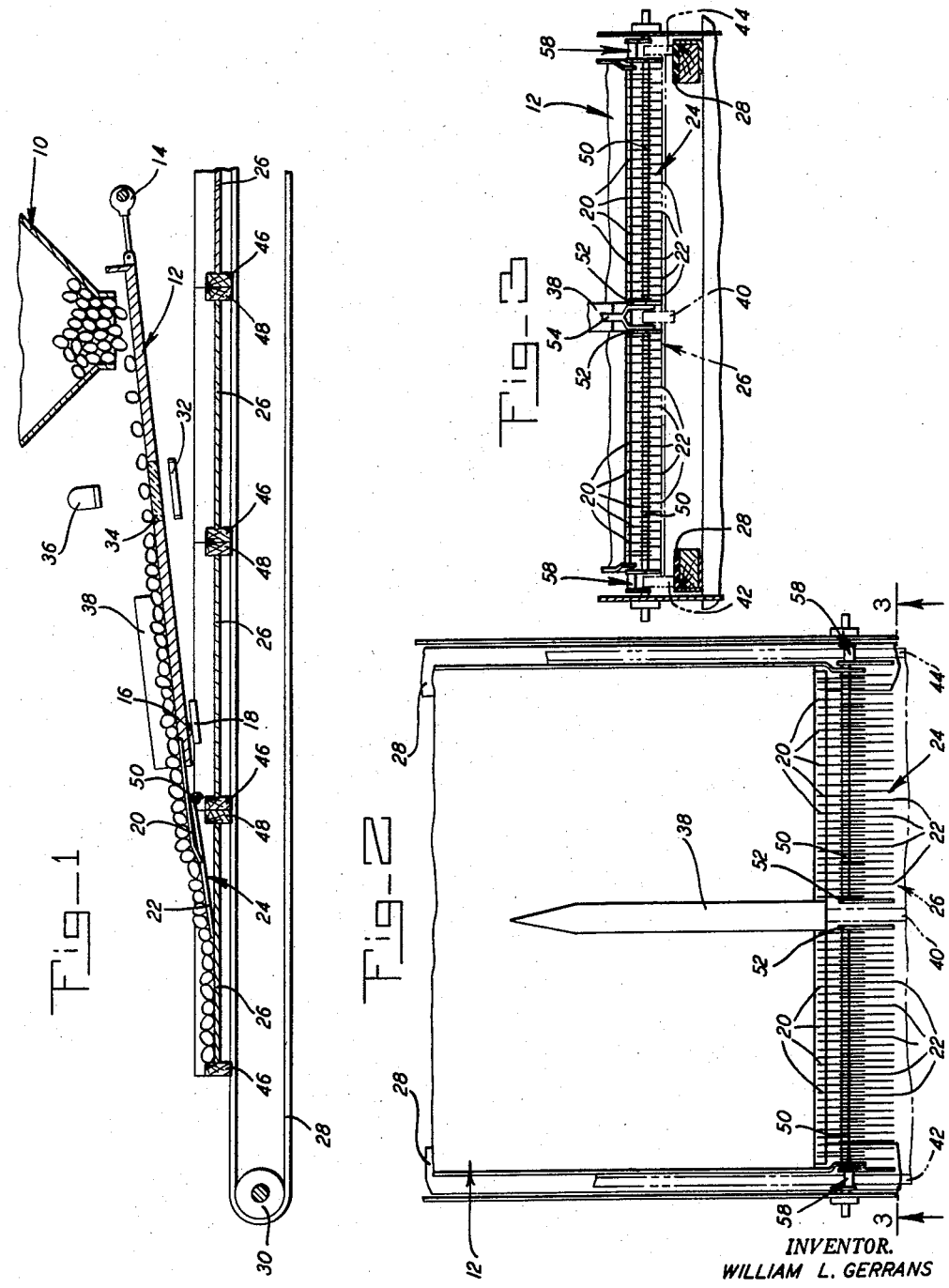

2,873,771
TRAY LOADING APPARATUS
William L. Gerrans, Saratoga, Calif.

Application September 26, 1955, Serial No. 536,615

6 Claims. (Cl. 141—131)

The present invention relates to apparatus for loading fruit or other articles onto trays and more particularly to tray loaders such as disclosed in the patent to William L. Gerrans, 2,133,442, issued October 18, 1938.

In the operation of a tray loader such as that disclosed in such patent, the fruit, for example, prunes are fed onto an inclined shaker table so as to be moved along and simultaneously spread out into a single layer. From the lower or discharge end of the table, the prunes move across a stationary apron for deposit in a single layer on the flat trays which move in file thereunder on a suitable conveyor. The stationary apron frictionally opposes the flow of prunes thereacross, which opposition must be overcome by the pressure of the following prunes that are still on the shaker table and are urged forward by the shaking action thereof. If a large flow of prunes is desired, the pressure required is greater, and the increased pressure against the prunes on the apron is sufficient to cause a piling of the prunes into a double or even triple layer so that the resultant spread of the prunes on the trays is not then in the desired single layer. Thus, the capacity of the tray loader is limited.

Accordingly, it is a general object of the present invention to provide a tray loader of the general type described which will significantly increase the capacity of fruit that may be handled thereby.

A feature of the invention relates to the design of the tray loader which provides for the maintenance of a single layer of fruit on the trays even though the overall rate of loading is increased by a factor of three or four.

Additionally, a feature of the invention relates to the reduction of frictional resistance to the flow of the fruit whereby such flow becomes smooth albeit rapid.

Other objects and features of the invention as well as the attendant advantages thereof will become more apparent from a perusal of the following description of the accompanying drawings wherein:

Fig. 1 is a fragmentary central longitudinal sectional view somewhat diagrammatic in nature indicating the general structural character of a tray loader embodying the present invention, Fig. 2 is a fragmentary plan view of the dicharge end of the fruit conveying and tray loading arrangement, Fig. 3 is a sectional view taken along line 3—3 of Fig. 2, Fig. 4 is an enlarged fragmentary plan view of a portion of the discharge end of the tray loader illustrating details thereof, Fig. 5 is a sectional view taken along line 5—5 of Fig. 4, and Fig. 6 is a sectional view taken along line 6—6 of Fig. 5.

As generally illustrated in Fig. 1, a tray loader embodying the present invention includes a suitable hopper 10 that is arranged to direct prunes or other fruit onto the higher end of an inclined shaker table 12 that is supported for reciprocatory movement. The details of the structure and operation of this shaker table 12 are described in the aforementioned patent to William L. Gerrans. As generally shown, arcuate movement is imparted to one end of the table by an eccentric indicated at 14 and the other lower end is supported for substantially rectilinear movement by means of a roller 16 movable along a track 18. The imparted reciprocatory movement causes the prunes to move down the inclined table 12 while simultaneously causing the same to be spread in a single layer thereon. Fingers indicated at 20 are secured to the discharge end of the shaker table 12 and are adapted to project between the fingers 22 that are arranged to form an apron generally indicated at 24 over which the prunes may pass onto a flat tray 26 that is conveyed thereunder on spaced conveyor belts 28 trained about suitable drive rollers, as indicated at 30.

When the tray loader is operating, the prunes are caused to be compacted rearwardly from the discharge end of the shaker table 12 an amount which is dependent upon the speed of tray conveyance and the rate of prune supply. Since the reciprocatory movement of the shaking table 12 imparts a forward force to each prune thereon, a correlation is set up between the compactness of the prunes on the shaker table 12 and the permitted speed of tray conveyance. More particularly, if the rate of prune supply is increased, a larger degree of compacting of the prunes on the shaker table 12 will result so that a greater rate of fruit conveyance is provided; and as a consequence, the belts 28 which convey the trays 26 themselves may be driven at a faster rate to ultimately produce a higher speed of tray loading.

In order to provide automatically the desired correlation between the compacting of fruit on the shaker table 12 and speed of tray conveyance, the drive for the tray conveyor belts 28 may be made variable and controllable by a suitable means for sensing the compactness or distribution of the fruit on the shaker table. As generally indicated in Fig. 1, a light source 32 is positioned below a transparent window 34 in the shaker table 12, and a light sensitive device such as a photoelectric cell 36 is supported thereover. As the compacting of the prunes over such transparent window 34 increases, the light reaching the photoelectric cell 36 will necessarily decrease and suitable electronic means can be provided to cause such decrease in light intensity to increase the speed of tray motion. The details both of structure and operation of this control arrangement are described in the copending application of William A. Gerrans, Ser. No. 535,115 filed September 19, 1955, to which reference is given.

This described control arrangement is sufficiently sensitive to provide for an accurate correlation between the degree of compacting of the prunes on the shaker table 12 and the speed of tray conveyance enabling trays to be loaded with prunes at rates up to 30 tons per hour whereas prior arrangements were limited to capacities of 10 tons per hour or less. However, when such control arrangement is applied to a structure such as that disclosed in the aforementioned patent to William L. Gerrans, this capacity cannot be realized. The feeder apron which transfers the prunes from the shaker table to the trays themselves provides so much frictional resistance to the flow of the fruit that a single layer of prunes is not maintained and a resultant pile-up of prunes on the trays to a depth of two or three layers results.

In accordance with the present invention an improved arrangement for the transfer of the prunes from the shaker table 12 to the trays 26 is provided to minimize the frictional resistance encountered in such transfer so that a significantly higher rate of loading may be obtained and full advantage taken of the capacities permitted by the incorporation of the above-mentioned photocell control arrangement.

As shown in Figs. 2 and 3, the discharge end of the shaker table 12 is provided with a central longitudinally extending raised portion or island 38 which accommodates the central rib 40 of a fruit tray 26 passing thereunder, the outer ribs 42 and 44 at opposite sides of the tray 26 riding on the belts 28 just beyond the outer edges of the shaker table 12. Thus the shaker table 12 may be considered as consisting of two divided sections each of which feeds one half of a conveyed tray. The projecting fingers 20 at the discharge end of the shaker table 12 terminate at a level which is just slightly above transverse ribs 46 and 48 formed at the forward and rearward edges of each tray 26, which ribs are substantially lower than the previously described three longitudinally extending ribs 40, 42 and 44 as can best be visualized with reference to Fig. 3. Thus, these fingers 20 come as close as possible to the fruit carrying surface of the trays 26 while yet providing the clearance required to enable the passage thereunder of the transverse ribs 46 and 48.

The feeder apron 24 is arranged to transfer the fruit from this level slightly above the transverse ribs 46, 48 of the trays 26 onto the fruit supporting surface thereof. For this purpose the bars or fingers 22 which form the feeder apron 24 are secured as by welding as best shown in Figs. 4, 5, and 6 to each of a pair of like bars 50 arranged parallel to and adjacent each of the divided discharge sections of the shaker table 12. At one end, each bar 50 is secured to a plate 52 that is in turn pivotally mounted at the side of a raised portion 54 of the machine frame that constitutes an extension of the raised island 38 in the shaker table as previously described to thus accommodate passage of the central rib 40 of each tray 26. At its other end, the bar 50 is secured to one leg 56 of a yoke-like bracket 58 that is arranged in bridging relation above a respective rib 42 or 44 at each side of the tray 26. The other leg 60 of the yoke 58 is connected to a bar 62 pivotally mounted in a side member 64 of the machine frame. As a consequence, the fingers 22 which form the feeder apron 24 can pivot about the axis as defined by the described pivotal mounting so that they normally are an inclined extension of the shaker table 12 with their ends resting on the flat surface of the trays, but can pivot, and as a consequence, ride over the transverse ribs 46, 48 of a tray moving thereunder. The position of the finger-supporting bar 50 is immediately above the level of such transverse ribs 46, 48 wherefore the distance across the feeder apron 24 that the prunes must traverse is reduced to an absolute minimum. With the discharge end of the shaker table 12 terminating as described and with the feeder apron 24 nesting between the longitudinally extending ribs 40, 42, 44 of the fruit supporting trays 26 also as described, fruit has been loaded onto trays at rates of 30 tons per hour or more while simultaneously achieving a closely compacted single layer of fruit on the trays in the manner desired.

Various alterations and or modifications can obviously be made without departing from the spirit of the invention; and the foregoing description of one embodiment of the invention is to be considered as exemplary and not in a limiting sense; the scope of the invention being indicated by the appended claims.

What is claimed is:

1. Apparatus for loading fruit or the like onto trays which comprises means for conveying trays continuously along a predetermined path, a feeder apron adapted to conduct fruit thereacross onto said trays, means pivotally supporting said apron on an axis substantially parallel to the fruit-supporting surface of the conveyed trays, transverse to the path of tray movement and immediately adjacent the same so that minimum clearance is maintained between said axis and the path of tray movement, said apron being dimensioned so that its free end is adapted to move into engagement with the fruit-supporting surface of said trays.

2. Apparatus for loading fruit or the like onto trays which comprises a table mounted in an inclined position and arranged to conduct the fruit thereacross from the higher to the lower end thereof, a feeder apron adjacent the lower end of said table and forming an extension thereof, means pivotally mounting said apron for free pivotal movement about a horizontal axis adjacent and parallel to the lower end of said table, and means for conveying horizontally disposed trays under said apron at a level such that clearance is closely maintained between the pivotally-mounted end of said apron and the conveyed trays, said apron being dimensioned such that its free end can pivot into engagement with the fruit-supporting surface of the trays and is normally urged by gravity into such engagement.

3. Apparatus for loading fruit or the like onto a tray having a fruit-supporting surface encompassed by transverse and longitudinal ribs which apparatus comprises means for conveying the tray along a predetermined path, a feeder apron adapted to conduct fruit thereacross and deposit the same on the fruit-supporting surface of the tray intermediate said longitudinal ribs, means pivotally supporting said apron for free pivotal movement on an axis parallel to the fruit-supporting surface of the conveyed trays, transverse to the path of tray movement and immediately above and adjacent the same whereby minimum clearance is maintained, said apron being dimensioned so that its free end is adapted to move under gravitational force into engagement with the fruit-supporting surface and additionally to pivot in opposition to gravitational force away from the predetermined path to permit passage thereunder of the transverse ribs of the tray.

4. Apparatus for loading fruit or the like onto a tray having a fruit-supporting surface encompassed by transverse and longitudinal ribs which apparatus comprises means for conveying the tray along a predetermined path, a feeder apron adapted to conduct fruit thereacross and deposit the same on the fruit-supporting surface of the tray intermediate said longitudinal ribs, means pivotally supporting said apron on an axis parallel to the fruit-supporting surface of the conveyed trays, transverse to the path of tray movement, and immediately adjacent the same whereby minimum clearance is maintained, said apron being dimensioned so that its free end is adapted to rest on the fruit-supporting surface and additionally to pivot away from the predetermined path to permit passage thereunder of the transverse ribs of the tray, said apron-supporting means including a yoke adapted to permit the passage of the longitudinal ribs of the tray thereunder.

5. Apparatus for loading fruit or the like onto trays which comprises means for conveying trays along a predetermined path, a table mounted in an inclined position and arranged to conduct fruit thereacross from the higher to the lower end thereof, a plurality of fingers projecting from the lower end of said table in the direction of movement of the trays, a feeder apron including a plurality of fingers arranged in interdigital relation with said projecting fingers and substantially in the same plane therewith, means supporting said apron for pivotal movement about an axis transverse to the path of the trays at a level such that minimum clearance is maintained between said apron-supporting means and the predetermined path and such that the free ends of said feeder apron fingers are adapted to engage the surface of said trays.

6. Apparatus for feeding articles which comprises means forming a moving surface adapted to receive the articles, a feeder apron adapted to conduct the articles thereacross onto said surface, means pivotally supporting said apron in a manner such that minimum clearance is maintained between said surface and the pivotally-supported portion of said apron, and the free end of said apron is arranged to normally engage the moving surface but may pivot so as to conform to any irregularities therein.

References Cited in the file of this patent

UNITED STATES PATENTS

| | | |
|---|---|---|
| 1,090,855 | Jagenberg | Mar. 24, 1914 |
| 2,741,886 | Garapolo et al. | Apr. 17, 1956 |